(12) United States Patent
Okamoto et al.

(10) Patent No.: US 9,809,723 B2
(45) Date of Patent: Nov. 7, 2017

(54) ACTIVE ENERGY RAY-CURABLE INKJET INK COMPOSITION

(71) Applicants: TOYO INK SC HOLDINGS CO., LTD., Chuo-ku (JP); TOYO INK CO., LTD., Chuo-ku (JP)

(72) Inventors: Mayuko Okamoto, Tokyo (JP); Tohru Konno, Tokyo (JP); Kazuhiro Jonai, Tokyo (JP)

(73) Assignees: TOYO INK SC HOLDINGS CO., LTD., Chuo-ku (JP); TOYO INK CO., LTD., Chuo-ku (JP)

( * ) Notice: Subject to any disclaimer, the term of this patent is extended or adjusted under 35 U.S.C. 154(b) by 0 days.

(21) Appl. No.: 14/024,038

(22) Filed: Sep. 11, 2013

(65) Prior Publication Data

US 2014/0069294 A1   Mar. 13, 2014

(30) Foreign Application Priority Data

Sep. 11, 2012 (JP) .................. 2012-199040
Sep. 11, 2012 (JP) .................. 2012-199041

(51) Int. Cl.
C09D 11/10 (2014.01)
C09D 11/30 (2014.01)
C08J 3/28 (2006.01)
C09D 11/322 (2014.01)
C09D 11/101 (2014.01)

(52) U.S. Cl.
CPC .......... *C09D 11/322* (2013.01); *C09D 11/101* (2013.01)

(58) Field of Classification Search
CPC ..... C09D 11/101; C09D 11/52; C09D 11/322; C09D 11/30
See application file for complete search history.

(56) References Cited

U.S. PATENT DOCUMENTS

| | | | |
|---|---|---|---|
| 4,262,120 A | 4/1981 | von der Crone | |
| 4,316,023 A | 2/1982 | Henning et al. | |
| 8,420,714 B2* | 4/2013 | Umebayashi | 523/160 |
| 2003/0083396 A1* | 5/2003 | Ylitalo et al. | 522/74 |
| 2004/0021753 A1 | 2/2004 | Yoshihiro et al. | |
| 2004/0147633 A1 | 7/2004 | Kamikubo et al. | |
| 2004/0214920 A1 | 10/2004 | Aoshima | |
| 2006/0189716 A1* | 8/2006 | Ushirogouchi et al. | 523/160 |
| 2006/0207478 A1 | 9/2006 | Ueno | |
| 2007/0002115 A1 | 1/2007 | Nakazawa | |
| 2008/0076846 A1 | 3/2008 | Kito et al. | |
| 2008/0233362 A1 | 9/2008 | Kato et al. | |
| 2010/0203262 A1 | 8/2010 | Umebayashi | |
| 2010/0239777 A1 | 9/2010 | Nakajima et al. | |
| 2011/0071239 A1 | 3/2011 | Araki et al. | |
| 2012/0003435 A1 | 1/2012 | Kameyama et al. | |
| 2013/0307913 A1 | 11/2013 | Kawashima et al. | |

FOREIGN PATENT DOCUMENTS

| | | |
|---|---|---|
| CA | 1 140 130 A | 1/1983 |
| CN | 1834165 A | 9/2006 |
| CN | 101082684 A | 12/2007 |
| CN | 101134800 A | 3/2008 |
| CN | 101270246 A | 9/2008 |
| CN | 101275042 A | 10/2008 |
| DE | 29 14 086 B1 | 9/1980 |
| EP | 1 254 933 A2 | 11/2002 |
| EP | 2 216 377 A1 | 8/2010 |
| JP | 53-126032 A | 11/1978 |
| JP | 55-157657 A | 12/1980 |
| JP | 56-81369 A | 7/1981 |
| JP | 56-81371 | 7/1981 |
| JP | 2002-241647 A | 8/2002 |
| JP | 2003-34765 | 2/2003 |
| JP | 2004-067991 A | 3/2004 |
| JP | 2004-224841 A | 8/2004 |
| JP | 2005-015770 A | 1/2005 |
| JP | 2006-298952 A | 4/2005 |
| JP | 2006-145703 | 6/2006 |
| JP | 2006-348206 | 12/2006 |
| JP | 2006-348206 A | 12/2006 |
| JP | 2007-007949 A | 1/2007 |
| JP | 2008-163342 A | 7/2008 |
| JP | 2008-189758 A | 8/2008 |
| JP | 2008-274022 A | 11/2008 |
| JP | 2009-161641 A | 7/2009 |
| JP | 4407128 | 11/2009 |
| JP | 2010-180376 | 8/2010 |
| JP | 2010-242069 A | 10/2010 |
| JP | 2012-193275 A | 3/2011 |
| JP | 2011-84727 | 4/2011 |
| JP | 2012-012471 A | 1/2012 |
| JP | 2012-12539 | 1/2012 |
| JP | 2012-153796 A | 8/2012 |
| JP | 2012-155231 A | 8/2012 |
| WO | WO 2012/102046 | 8/2012 |

OTHER PUBLICATIONS

Technical Data Sheet for NOVOPERM Yellow P-M3r (Pigment 139) from Clariant. (2013). Retrieved online on Apr. 3, 2014. Retrieved from internet <URL:http://www.clariant.com/en/Solutions/Products/2014/03/18/17/13/Novoperm-Yellow-PM3R?p=1>.*
Extended European Search Report dated Nov. 29, 2013 in Patent Application No. 13183866.6.
Office Action dated Jan. 23, 2017, in Chinese Application No. 201310411256.7, dated Sep. 11, 2013 ( with English-language Translation).

* cited by examiner

*Primary Examiner* — Sanza McClendon
(74) *Attorney, Agent, or Firm* — Oblon, McClelland, Maier & Neustadt, L.L.P.

(57) ABSTRACT

Provided is an active energy ray-curable inkjet ink with high productivity which has the same quality level as the conventional printing and which contains an isoindoline-based pigment having a specific electric conductance, which is measured according to DIN ISO 787/14, of 150 μS/cm or less.

5 Claims, No Drawings

ACTIVE ENERGY RAY-CURABLE INKJET INK COMPOSITION

BACKGROUND OF THE INVENTION

1. Field of the Invention

The present invention relates to an active energy ray-curable inkjet ink composition.

2. Description of the Related Art

Conventionally, active energy ray-curable inkjet inks, which can be dried more quickly than solvent-type inkjet inks, have been often used in signage printers for high speed printing. Such active energy ray-curable inkjet inks also have excellent adhesion to base materials and thus have been used in flat bed printers for printing on various base materials. Further, inks have been developed to meet applications.

These printers scan a printing head to meet an increase in size, in film thickness, or in high density. In recent years, as printing head technology has advanced, technology that enables a printing head to eject micro-droplets at high frequency has been established. With the merit of digitization, the achievement of this technology has increased the chance of replacing conventional printing methods with inkjet printing, which used to be inferior in productivity or image quality.

Moreover, a 1-pass type printer has been proposed in which inks are ejected from at least two or more of inkjet heads and then are cured at the same time. Accordingly, it is possible to realize low cost of equipment and high productivity and thus the replacing of conventional printing methods is further accelerated.

However, in order to realize replacing conventional printing methods with inkjet printing methods, it is necessary to develop an ink having high-frequency suitability better than that of conventional one and having low viscosity/high sensitivity, and stable ejection characteristics over a long time. High-frequency suitability, high sensitivity, and stable ejection characteristics for a long period of time contribute to an improvement in productivity, and thus are features required of the ink for achieving productivity as high as conventional printing. Lower ink viscosity contributes to an improvement in the accuracy of droplet landing, and thus is a feature required of the ink for achieving high-definition image quality. In addition, the substitution of inkjet printing for conventional offset printing also requires an improvement in color reproducibility. However, it has been very difficult, particularly for an active energy ray-curable inkjet ink, to satisfy all required properties including image color reproducibility, curing properties, discharge stability, and the like.

In a case where the amount of the application of ink composition droplets is increased in order to achieve wide color reproducibility, cracking of the cured film may occur to disturb the image or to degrade fixing properties. In a case where an ink composition is prepared with a higher concentration of a pigment, the ink composition may have higher viscosity or contain a higher concentration of coarse particles. This may cause a problem in discharge stability over a long time. Therefore, in order to achieve wide color reproducibility, it is important to select a pigment capable of exhibiting the same level of color reproducibility as that of offset printing with a low concentration of the pigment.

JP 2003-34765 A discloses a set of color inkjet inks for color printing, which not only includes magenta, yellow, and cyan inks commonly used, but also includes an ink selected from orange, green, and violet inks containing a water-soluble dye. Accordingly, a method has been proposed which provides an ink set capable of producing an image having better color gamut than an image obtained by using an ink set in the related art. However, since an increase in the number of ink colors means an increase in the number of recording heads, this method can cause an increase in the cost and size of equipment. Therefore, it is practically difficult to unlimitedly increase the number of ink colors, and thus there has been a limit to the available image quality.

In JP 2006-145703 A, a method is proposed which provides a yellow toner that uses C. I. Pigment Yellow 185 as a pigment having wide color reproducibility. However, the pigment is too coarse in this dispersion state. Accordingly, when the pigment is used as an inkjet ink, the inkjet head is clogged with the pigment particles and thus it is difficult to stably discharge the ink.

In Japanese Patent Application Nos. 2009-027361, 2010-172141, and 2010-152355 (that is, JP 2010-180376 A, JP 2011-084727A, and JP 2012-012539 A), an active energy ray-curable inkjet ink using an isoindoline-based pigment, specifically, using C. I. Pigment Yellow 185 is proposed. The C. I. Pigment Yellow 185 has very wide color reproducibility and can realize a wide range of color reproduction using a small number of ink colors. However, since a large amount of pigment precursors and by-products thereof is contained in a manufacturing process of the pigment, the pigment precursors and the by-products thereof inhibit pigment dispersion. In particular, it is very difficult to disperse the above-described pigment in a monomer. Accordingly, there is a problem in discharge stability which is the most important property as an inkjet ink, and thus it is difficult to maintain stable ejection characteristics over a long time. Moreover, a certain amount of the pigment precursors and the by-products thereof is dissolved in a monomer, and dissolution and precipitation thereof are repeated in a flow path or in a head of inkjet, which causes the ink not to be discharged. This fact causes the ejection characteristics over a long time to be further deteriorated. Accordingly, when printing is performed for a long period of time, the ink is not discharged or is deflected. Therefore, there is a problem in reliability of inkjet ink that quality of prints is degraded. As a result, although attention has been paid to the color reproducibility of the pigment, the pigment has not been widely used so far. In Japanese Patent Application Nos. 2009-027361, 2010-172141, and 2010-152355, there are also problems in that a case where ink is not discharged occurs when performing discharge for a long period of time and ejection characteristics over time are deteriorated. In addition, since the discharge stability is deteriorated at high frequency and at high ejection speed, productivity has to be lowered when used as a 1 pass-curable ink.

SUMMARY OF THE INVENTION

According to a first embodiment of the invention, there is provided an active energy ray-curable inkjet ink composition with high productivity which has the same quality level as the conventional printing. In addition, there is also provided an active energy ray-curable inkjet ink composition which is provided to a digital printer.

In other words, the first embodiment of the invention relates to an active energy ray-curable inkjet ink composition which contains an isoindoline-based pigment having a specific electric conductance, which is measured according to DIN ISO 787/14 of 150 µS/cm or less.

According to the first embodiment of the invention, it is possible to provide an ink which achieves a balance between high color reproducibility and high curing property, and is excellent in ejection characteristics when printing is performed at high frequency and at high ejection speed, compared to the related art.

As a method for lowering a specific electric conductance, a method is useful in which the concentration of a pigment precursor and a by-product thereof in the pigment is lowered to decrease the concentration of impurities in the ink. Accordingly, it is possible to obtain an ink with good ejection stability. According to a second embodiment of the invention, there is provided an active energy ray-curable inkjet ink composition with high reliability and productivity which stably exhibits a high printing quality over a long time. In addition, there is also provided an active energy ray-curable inkjet ink composition which is provided to a digital printer.

In other words, the second embodiment of the invention relates to an active energy ray-curable inkjet ink composition containing an isoindoline-based pigment in which a pigment precursor and a by-product thereof are included at an amount of 5% by weight or less in the pigment.

According to the second embodiment, it is possible to provide an ink which is excellent in ejection characteristics for a long period of time compared to the related art and achieves a balance between high color reproducibility and high productivity.

The present disclosure contains subject matter related to that disclosed in Japanese Patent Application Nos. 2012-199040 and 2012-199041 filed on Sep. 11, 2012, the entire contents of which are hereby incorporated by reference.

DETAILED DESCRIPTION OF THE PREFERRED EMBODIMENTS

Hereinafter, an active energy ray-curable inkjet ink composition of the present embodiment will be described. The description is made in common between a first embodiment and a second embodiment unless otherwise specified.

(Active Energy Ray-Curable Inkjet Ink Composition)

The active energy ray-curable inkjet ink composition may contain an isoindoline-based pigment, a pigment dispersing agent, a monomer (hereinafter, the "active energy ray-curable inkjet ink composition" of the present embodiment is described as an "ink" or an "ink composition" in some cases).

The "active energy ray" described in the present specification collectively means ionizing radiation or light like an electron beam, $\alpha$ rays, $\gamma$ rays, X rays, neutron rays, or ultraviolet rays. Among them, it is preferable to use the electron beam or the ultraviolet rays which are no harmful to human bodies, have good handleability, and are widely used in the industrial field.

The ink composition may be prepared by sufficiently dispersing a monomer, a pigment dispersing agent and a pigment using a common dispersing machine such as a sand mill to obtain a pigment dispersion element and then adding a monomer and other additives to the obtained pigment dispersion element. This method allows even a common dispersing machine to achieve sufficient dispersion and thus does not require excessive dispersion energy or long dispersion time. Therefore, this method is less likely to degrade ink components during dispersion and makes it possible to prepare a highly stable ink.

Under the conditions of preparing the pigment dispersion element, microbeads are preferably used. Specifically, in order to prepare a low-viscosity and stable dispersion element, microbeads of 0.1 mm to 2 mm are preferably used. More preferably, microbeads of 0.1 mm to 1 mm are used for the improvement of productivity and for the preparation of a dispersion element with good dischargeability.

After the dispersion, the ink composition is preferably filtered through a filter. The pore size of the filter is preferably 3 μm or less, and more preferably 1 μm or less.

(1 Pass-Curable Inkjet Printing Method)

The "1 pass-curable" inkjet printing method in the present specification is a printing method capable of completing print (printing) on a medium to be printed one time and is suitable for professional quality printing requiring printing speed. In recent years, when inkjet printing is used as the substitution of conventional offset printing, productivity is a considerably important property and the 1 pass-curable inkjet printing receives expectations. Further, if high speed printing of 25 m/M (meter/minute), preferably of 50 m/M or the like, can be performed in the 1 pass-curable inkjet printing, it can be said that this fact leads to expansion of using the 1 pass-curable inkjet printing as the substitution of conventional offset printing.

(Isoindoline-Based Pigment)

The isoindoline-based pigment is not particularly limited as long as it is a pigment having an isoindoline structure, but is preferably an isoindoline-based yellow pigment. Examples of the isoindoline-based yellow pigment include C. I. Pigment Yellow 139 and C. I. Pigment Yellow 185. Among them, it is preferable to use C. I. Pigment Yellow 185 in terms of its wide color reproduction range and high tinting strength.

Since the conventional isoindoline-based pigment, particularly, C. I. Pigment Yellow 185 contains a large amount of pigment precursors and by-products thereof in a manufacturing process of the pigment, these pigment precursors and by-products thereof inhibit pigment dispersion. In particular, it is very difficult to disperse the above-described pigment in a monomer. Accordingly, there is a problem in discharge stability which is the most important property as an inkjet ink and thus it is difficult to maintain stable ejection characteristics over a long time. Moreover, a certain amount of the pigment precursors and by-products thereof is dissolved in a monomer, and dissolution and precipitation thereof are repeated in a flow path or in a head of inkjet, which causes the ink not to be discharged. This fact causes the ejection characteristics over a long time to be further deteriorated. Accordingly, when printing is performed for a long period of time, the ink is not discharged or is deflected. Therefore, there is a problem in reliability of inkjet ink that quality of prints is lowered. As a result, although attention has been paid to the color reproducibility of the pigment, the pigment has not been widely used so far.

Examples of the representative product name of conventional C. I. Pigment Yellow 185 include "Pariotol Yellow D1155" manufactured by BASF.

The "pigment precursor" and the "by-product thereof" in the pigment in the present specification indicate an unreacted compound of a raw material used in a synthesizing process of the pigment, an intermediate compound in a synthesizing process of the pigment, or a compound collaterally produced by oxidizing, hydrolyzing, or the like the unreacted compound or the intermediate compound. For example, when C. I. Pigment Yellow 185 is used as a pigment, they indicate a compound having an isoindoline skeleton other than C. I. Pigment Yellow 185.

In order to solve the above-described problems, in the isoindoline-based pigment, the concentration of the pigment precursor and the by-product thereof in the pigment is preferably 5% by weight or less, more preferably 3% by weight or less, and particularly preferably 1% by weight or less. When the concentration of the pigment precursor and the by-product thereof in the pigment is within the above-described range, the pigment is stably dispersed in the monomer. Further, since precipitates are not generated, stable printing quality can be maintained over a long time.

Hereinafter, a test method to measure the concentration of a pigment precursor and a by-product thereof in the pigment will be described.

95 g of methyl ethyl ketone (MEK) is added to 5 g of the pigment and the mixture is treated in an ultrasonic bath for 6 hours. Subsequently, the pigment is separated from the liquid by filtration using a filter having a pore size of 1 μm or less, the pigment on the filter is then washed with 50 g of MEK, and the pigment on the filter paper is dried for 1 hour at 100° C. The concentration of the pigment precursor and the by-product thereof in the pigment is calculated from the following formula.

(Concentration of the pigment precursor and the by-product thereof in the pigment)=((5 g of the pigment weight before treatment)−(the pigment weight after drying (g))/(5 g of the pigment weight before treatment)

As a method to lower the concentration of the pigment precursor and the by-product thereof in the pigment, although not particularly limited, a method in which the conventional isoindoline-based pigment is prepared by being washed with a solvent is preferable from the viewpoint of obtaining a pigment having lower concentration of impurities. The solvent for washing may be freely selected as long as it can dissolve a pigment precursor and a by-product thereof without dissolving the pigment itself.

Specific examples of the cleaning solvent include, although not limited to the following examples, alcohols, ether alcohols, ethers, ketones, carboxylic amides, carboxylic esters, and a mixture thereof. The respective examples include as follows:

aliphatic or araliphatic, monohydric or polyhydric alcohols having up to 10 carbon atoms, such as methanol, ethanol, propanol, isopropanol, butanol, isobutanol, t-butanol, amyl alcohol, isoamyl alcohol, hexanol, isohexanol, heptanol, octanol, 2-ethylhexanol, ethylene glycol, 1,2-propylene glycol, and 1,3-propylene glycol, cyclohexanol, methylcyclohexanol, benzyl alcohol, and 2-phenylethanol;

mono-C2 to C3-alkylene glycol mono-C1 to C4-alkyl ethers, and di-C2 to C3-alkylene glycol mono-C1 to C4-alkyl ethers, such as ethylene glycol monomethyl ether, ethylene glycol monoethyl ether, ethylene glycol monobutyl ether, diethylene glycol monomethyl ether, and diethylene glycol monoethyl ether;

acyclic or cyclic aliphatic ethers having up to 10 carbon atoms, such as dipropyl ether, diisopropyl ether, dibutyl ether, diisobutyl ether, tetrahydrofuran, dioxane, diethylene glycol dimethyl ether, and diethylene glycol diethyl ether;

acyclic or cyclic aliphatic and araliphatic ketones having up to 10 carbon atoms, such as acetone, methyl ethyl ketone, methyl propyl ketone, methyl butyl ketone, diethyl ketone, methyl isopropyl ketone, methyl isobutyl ketone, cyclopentanone, cyclohexanone, methylcyclohexanone, acetophenone, and propiophenone;

amides, and C1 to C4 alkylamides of aliphatic carboxylic acids having up to 4 carbon atoms, such as formamide, N,N-dimethylformamide, N,N-diethylformamide, N,N-dimethylacetamide, N,N-diethylacetamide, N,N-dimethylpropionamide, N,N-diethylpropionamide, and N-methylpyrrolidone; and esters of aromatic carboxylic acids having altogether up to 12 carbon atoms, such as esters of dimethyl phthalate and diethyl phthalate.

Preference is given to the use of a solvent which is easy to remove in after-treatment after washing a pigment out.

Particularly preferable examples of the solvent include:

alcohols, such as methanol, ethanol, propanol, isopropanol, butanol, isobutanol, t-butanol, amyl alcohol, isoamyl alcohol, hexanol, isohexanol, heptanol, octanol, 2-ethylhexanol, ethylene glycol, 1,2-propylene glycol, and 1,3-propylene glycol, cyclohexanol, methylcyclohexanol, benzyl alcohol, and 2-phenylethanol;

acyclic or cyclic aliphatic ethers, such as dipropyl ether, diisopropyl ether, dibutyl ether, diisobutyl ether, tetrahydrofuran, dioxane, diethylene glycol dimethyl ether, and diethylene glycol diethyl ether; and ketones, such as acetone, methyl ethyl ketone, methyl propyl ketone, methyl butyl ketone, diethyl ketone, methyl isopropyl ketone, methyl isobutyl ketone, cyclopentanone, cyclohexanone, methylcyclohexanone, acetophenone, and propiophenone.

These solvents have high solubility of a pigment precursor and a by-product and are easy to remove in after-treatment, which are preferable.

The washing may be performed once or, if necessary, may be performed twice or more times.

In order to lower the concentration of the pigment precursor and the by-product thereof in the pigment, the isoindoline-based pigment may be further washed with water, dilute acetic acid solution, dilute sulfuric acid solution, dilute phosphoric acid solution, or dilute hydrochloric acid solution, in addition to washing with the above-described solvents. Accordingly, it is possible to further lower the concentration of the pigment precursor and the by-product thereof in the pigment.

The conventional isoindoline-based pigment, in particular, C. I. Pigment Yellow 185 is very difficult to be dispersed in the monomer and thus there is a problem in discharge stability that is the most important property as an inkjet ink. Moreover, a variation in the specific electric conductance of the pigment is large for each lot. Depending on manufacturing lots, a variation in discharge occurs even when each ink is prepared in the same manner and thus there is a problem in that each ink varies in printing quality. Above all, since the discharge stability is deteriorated at high frequency and at high ejection speed, productivity has to be lowered when used as a 1 pass-curable ink.

In order to solve the above-described problems, the specific electric conductance of the isoindoline-based pigment which is measured according to DIN ISO 787/14 is preferably 150 μS/cm or less, and more preferably 100 μS/cm or less. When the specific electric conductance is within the above-described range, the pigment dispersion in the monomer is stabilized. Moreover, energy propagation in the head is carried out efficiently. Therefore, it is possible to stabilize ink discharge and maintain stable printing quality over a long time. Moreover, since the discharge stability is also enhanced at high frequency and at high ejection speed, it is possible to increase productivity compared to the conventional C. I. Pigment Yellow 185. Therefore, the pigment can be used as a 1 pass-curable ink which has high productivity.

The measurement method of the specific electric conductance according to DIN ISO 787/14 will be described. 1.5 g of the pigment, 2.0 ml of modified ethanol, and 26.5 ml of double distilled water are placed in a 50 ml Erlenmeyer flask made of polypropylene copolymer or a test tube. The opening of the Erlenmeyer flask or the test tube is covered with a cover and the mixture is heated in a water bath at 60° C. for 60 minutes. Thereafter, the mixture is filtered with a filter and cooled to room temperature, and then the electric conductance is measured. The blank measurement in which the pigment is excluded is performed in the same procedure. The electric conductance is calculated by subtracting a blank value from the previously measured value in which the pigment is present.

In the first embodiment, from the viewpoint that sufficient chroma can be obtained, sufficient curing property can be obtained in 1 pass curing, and the viscosity is within an appropriate range of inkjet discharge, the isoindoline-based pigment is contained preferably at an amount of 0.1% by weight or more and 15% by weight or less, more preferably at an amount of 0.5% by weight or more and 10% by weight or less, and particularly preferably at an amount of 0.8% by weight or more and 6% by weight or less, in the total weight of the ink composition.

In the second embodiment, from the viewpoint that sufficient chroma can be obtained, stable ejection characteristics over a long time is exhibited, sufficient curing property can be obtained, and the viscosity is within an appropriate range of inkjet discharge, the isoindoline-based pigment is contained preferably at an amount of 0.1% by weight or more and 15% by weight or less, more preferably at an amount of 0.5% by weight or more and 10% by weight or less, and particularly preferably at an amount of 0.8% by weight or more and 5% by weight or less, in the total weight of the ink composition.

(Pigment Dispersing Agent)

The pigment dispersing agent is generally classified into a pigment dispersing aid and a resin-type pigment dispersing agent.

The pigment dispersing aid has an organic pigment as a main skeleton and is a compound obtained by incorporating a substituent, such as a sulfonic acid, a sulfonamide group, an aminomethyl group, and a phthalimide methyl group, in a side chain or a metal salt compound.

Among them, when a pigment dispersing aid containing a triazine ring in the skeleton or a pigment dispersing aid containing aluminum sulfonate is used, dispersion is considerably stabilized with respect to the pigment used in the present embodiment. Accordingly, it is possible to stabilize dischargeability and to realize high productivity even in the case of continuous discharging for a long period of time. Moreover, since stable dischargeability is exhibited even in a high frequency range of 20 kHz or higher, it is possible to realize high precision and high productivity.

The amount of the pigment dispersing aid added is arbitrarily selected while ensuring the desired stability. From the viewpoint of flow properties of the ink, the effective component of the pigment dispersing aid (that is, the solid content (non-volatile component) of the pigment dispersing aid) is contained preferably at an amount of 3 to 12 parts by weight and more preferably at an amount of 5 to 10 parts by weight, based on 100 parts by weight of the pigment. Within this range, dispersion stability of the ink is enhanced and the ink can retain the same quality as the original even after long-term storage.

The main chain skeleton of the resin-type pigment dispersing agent is not particularly limited, but examples thereof include a polyurethane skeleton, a polyacrylic skeleton, a polyester skeleton, a polyamide skeleton, a polyimide skeleton, and a polyurea skeleton. Among them, the polyurethane skeleton, the polyacrylic skeleton, and the polyester skeleton are preferable from the viewpoint of storage stability of the ink composition. Further, the structure of the resin-type pigment dispersing agent is not particularly limited either, but examples thereof include a random structure, a block structure, a comb structure, and a star structure. Similarly from the viewpoint of storage stability, the block structure or the comb structure is preferable.

Specific examples of the resin-type pigment dispersing agent include, although not limited to the following examples, commercial wetting dispersing agents DISPER BYK series 101, 102, 103, 106, 108, 109, 110, 111, 112, 116, 130, 140, 142, 145, 161, 162, 163, 164, 166, 167, 168, 170, 171, 174, 180, 182, 183, 184, 185, 2000, 2001, 2020, 2050, 2070, 2096, and 2150 and BYKJET series 9130, 9131, 9132, 9133, and 9150 sold by BYK-Chemie GmbH;

EFKA series 4008, 4009, 4010, 4015, 4020, 4046, 4047, 4050, 4055, 4060, 4080, 4300, 4330, 4340, 4400, 4401, 4402, 4403, 4406, 4800, 5010, 5044, 5054, 5055, 5063, 5064, 5065, 5066, 5070, and 5244 sold by Ciba Specialty Chemicals Inc.;

Solsperse series 3000, 5000, 11200, 13240, 13650, 13940, 16000, 17000, 18000, 20000, 21000, 24000SC, 24000GR, 26000, 28000, 31845, 32000, 32500, 32550, 32600, 33000, 34750, 35100, 35200, 36000, 36600, 37500, 38500, 39000, 41000, 53000, 53095, 54000, 55000, 56000, 71000, 76400, 76500, and J100 sold by Lubrizol Corporation;

DISPARLON series 1210, 1220, 1831, 1850, 1860, 2100, 2150, 2200, 7004, KS-260, KS-273N, KS-860, KS-873N, PW-36, DN-900, DA-234, DA-325, DA-375, DA-550, DA-1200, DA-1401, and DA-7301 sold by Kusumoto Chemicals Ltd.;

AJISPER series PB-711, PB-821, PB-822, PB-824, PB-827, PB-711, PN-411, and PA-111 sold by Ajinomoto Fine-Techno Co.;

Surfynol series 104A, 104C, 104E, 104H, 104S, 104BC, 104DPM, 104PA, 104PG-50, 420, 440, DF110D, DF110L, DF37, DF58, DF75, DF210, CT111, CT121, CT131, CT136, GA, TG, and TGE sold by Air Products and Chemicals. Inc.;

Olfine series STG and E1004 sold by Nissin Chemical Industry Co., Ltd.;

SN Sperse series 70, 2120, and 2190 manufactured by San Nopco Ltd.;

ADEKA COL and ADEKA TOL series sold by ADEKA Corp.;

SANNONIC series, NAROACTY CL series, EMULMIN series, NEWPOL PE series, IONET M series, IONET D series, IONET S series, IONET T series, and SANSEPARER 100 sold by Sanyo Chemical Industries, Ltd.;

Flownon SH-290 and SP-1000, and Polyflow No. 50E and No. 300 sold by KYOEISHA CHEMICAL Co., Ltd.; and Nikkol T106, MYS-IEX, and Hexag line 4-0 sold by Nikko Chemicals Co., Ltd.

Among them, from the viewpoint of stabilizing dispersion of a pigment and enhancing discharge stability, a basic resin-type pigment dispersing agent having a block structure or a comb structure is preferable. Moreover, when an acrylic resin having a weight average molecular weight Mw of 20,000 or less is combined with the pigment of the present embodiment, it is possible to obtain a pigment dispersion element having excellent high frequency characteristics and good storage stability, which is preferable.

The amount of the resin-type pigment dispersing agent added is arbitrarily selected while ensuring the desired stability. From the viewpoint of obtaining excellent flow properties of the ink, the effective component of the resin-type pigment dispersing agent (that is, the solid content (non-volatile component) of the resin-type pigment dispersing agent) is contained at an amount of 20 to 150 parts by weight based on 100 parts by weight of the pigment. Within this range, dispersion stability of the ink is enhanced and the ink can retain the same quality as the original even after long-term storage. Moreover, when the effective component of the resin-type pigment dispersing agent is contained at an amount of 30 parts by weight to 100 parts by weight based on 100 parts by weight of the pigment, dispersion is considerably stabilized, and stable dischargeability is exhibited even in a high frequency range of 20 kHz or higher. Accordingly, it is possible to realize high precision and high productivity. It is more preferable that the effective component be contained at an amount of 30 parts by weight to 70 parts by weight.

(Monomer)

A monomer can be freely selected as long as it does not obstruct an object. The "monomer" specified in the present specification refers to a compound in which polymerization reaction is induced directly or through a photopolymerization initiator after irradiating the compound with active energy rays. Specific examples of the monomer include an acrylic monomer such as a mono-functional acrylic monomer, a bi-functional acrylic monomer, and a tri-, or more-functional acrylic monomer, a vinyl monomer, a vinyl ether monomer, a vinyl ester monomer, a heterogeneous monomer containing acryl and vinyl in the molecule, an allyl ether monomer, or an allyl ester monomer.

When the monomer is used at an amount of 40% to 90% by weight in the ink, it is possible to achieve a balance between the curing property, the discharge stability, and wide color reproducibility, which is preferable. The amount of the monomer is more preferably 50% to 90% by weight and even more preferably 60% to 90% by weight.

Among them, a monomer having EO or PO as a main skeleton is preferable. When the pigment of the present embodiment is used with the monomer, the pigment exhibits a good curing property and can be cured by 1 pass. Moreover, solvent resistance as a coating film is also improved. The monomer having EO or PO as a main skeleton refers to a monomer containing an EO or PO group in a site where an acryloyl group, a vinyl group, or a vinyl ether group, which is a reactive group, is removed.

More preferably, the bi-functional monomer is selected from VEEA (2-(2-vinyloxyethoxy)ethyl acrylate), DPGDA (dipropylene glycol diacrylate), and DVE-3 (triethylene glycol divinyl ether). When the bi-functional monomer is used, the solubility of the pigment precursor and the by-product thereof in the isoindoline-based pigment is high, and deflection and non-discharge are not likely to occur. Further, since the viscosity is relatively low, discharge stability is also excellent and stable discharge can be performed even in high-speed printing. Moreover, the curing property is specifically improved and by increasing the printing speed in 1 pass, it is possible to improve productivity. The amount of the bi-functional monomer added in the ink is preferably 10% to 90% by weight, more preferably 20% to 90% by weight, and particularly preferably 40% to 90% by weight.

In addition to the monomer, by adding N-vinylcaprolactam, it is possible to further increase the solubility of the pigment precursor and the by-product thereof, and by enhancing curing property, it is possible to cope with high-speed printing. From the viewpoint of storage stability and discharge stability of the ink, the amount of N-vinylcaprolactam added in the ink is preferably 15% by weight or less, more preferably 0.5% to 15% by weight, and particularly preferably 2% to 10% by weight.

The monomers may be used singly, or if necessary, two or more kinds may be used.

Besides the above-described monomers, an oligomer or a prepolymer may also be used in the ink composition.

(Additive)

Additives may be added to the ink of the present embodiment, if necessary. Examples of the additives include an initiator, an inhibitor, a surface tension control agent, and an organic solvent.

(Initiator)

Initiators indicate general compounds which generate radical active species that initiate polymerization reaction by light irradiation, and also include sensitizers in addition to a photoradical polymerization initiator. The initiators may be freely selected according to curing speed, curable coating film properties, and coloring materials.

When the isoindoline-based pigment of the present embodiment is used, it is preferable to use, as an initiator, 2,4,6-trimethylbenzoyl diphenylphosphine oxide, bis(2,4,6-trimethylbenzoyl)-phenylphosphine oxide, 2,4-diethylthioxanthone, 2-isopropylthioxanthone, oligo(2-hydroxy-2-methyl-1-(4-(1-methylvinyl)phenyl)propanone), 2-benzyl-2-dimethylamino-1-(4-morpholino phenyl)-butanone-1,2-dimethylamino-2-(4-methyl-benzyl)-1-(4-morpholin-4-yl-phenyl)-butan-1-one, [4-[4-methyl phenyl]thio]phenyl] phenyl methanone, 4-(dimethylamino)ethyl benzoate, 1-[4-(2-hydroxyethoxy)phenyl]-2-hydroxy-2-methyl-1-propane-1-one, or 4,4'-bis-(dimethylamino)benzophenone. Since the isoindoline-based pigment is a pigment exhibiting absorption of light in visible range from ultraviolet range, as approaching the bottom portion from the printed ink surface, ultraviolet rays attenuate greatly and irregularity in curing occurs. In particular, when inkjet printing is performed on a specific thick film having a thickness of more than 5 µm, irregularity in curing may occur in some cases. By using the above-described initiator, it is possible to prevent surface wrinkling derived from irregularity in curing. By concurrently using two or more kinds of initiators absorbing a different wavelength, it is possible to sufficiently utilize ultraviolet rays. Therefore, the surface wrinkling is greatly improved.

Above all, when the isoindoline-based pigment is used together with the monomer having EO or PO as a main skeleton, by containing an acyl phosphine oxide initiator, it is possible to realize high-speed curing, which is preferable from the viewpoint of productivity.

When the isoindoline-based pigment of the present embodiment is used, by adding an amine compound, the storage stability is improved. When a sensitizer such as 4-(dimethylamino)ethyl benzoate, and 4,4'-bis(diethylamino)benzophenone is used as the amine compound, it is also possible to improve radical generation efficiency of a photoradical polymerization initiator at the same time, which is preferable.

The initiator is preferably used at an amount of 2% to 25% by weight in the ink, more preferably at an amount of 3% to 20% by weight, and particularly preferably at an amount of 5% to 20% by weight. When the initiator is within the above-described range, high-speed curability is compatible with color reproduction.

(Inhibitor)

In order to enhance viscosity stability of the ink over time, dischargeability after time elapses, and viscosity stability on equipment in a recording apparatus, inhibitors are preferably used. As the inhibitors, a hindered phenol compound, a phenothiazine compound, a hindered amine compound, or a phosphorus compound is particularly preferably used.

Specific examples of the inhibitors include, although not limited to the following examples, IRGANOX 1010, 1010FF, 1035, 1035FF, 1076, 1076FD, 1076DWJ, 1098, 1135, 1330, 245, 245FF, 245DWJ, 259, 3114, 565, 565DD, and 295" (manufactured by BASF), "BHT SWANOX", "NONFLEX Alba, MBP, EBP, CBP, and BB", and "TBH" (all manufactured by Seiko Chemical Co., Ltd.), "AO-20, 30, 50, 50F, 70, 80, and 330" (manufactured by ADEKA Corp.), "H-BHT" (manufactured by Honshu Chemical Industry Co., Ltd.), and "YOSHINOX BB, 425, and 930" (manufactured by API Corp.) as a hindered phenol compound;

"phenothiazine" (manufactured by Seiko Chemical Co., Ltd.), and "phenothiazine", "2-methoxy phenothiazine", and "2-cyano phenothiazine" (all manufactured by Sakai Chemical Industry Co., Ltd.) as a phenothiazine compound;

"IRGANOX 5067" and "TINUVIN 144, 765, 770DF, and 622LD" (all manufactured by BASF), "NONFLEX H, F, OD-3, DCD, and LAS-P", "STEARER STAR", "diphenylamine", "4-aminodiphenylamine" and "4-oxydiphenylamine" (all manufactured by Seiko Chemical Co., Ltd.), "HO-TEMPO" (manufactured by Evonik Degussa GmbH), and "FANCRYL 711MM, and 712HM" (manufactured by Hitachi Chemical Company, Ltd.) as a hindered amine compound;

"triphenylphosphine" and "IRGAFOS 168 and 168FF" (all manufactured by BASF) and "NONFLEX TNP" (manufactured by Seiko Chemical Co., Ltd.) as a phosphorus compound; and"IRGASTAB UV-10 and 22" (manufactured by BASF), "hydroquinone", "methoquinone", "toluquinone", "MH", "PBQ", "TBQ", and "2,5-diphenyl-p-benzoquinone" (all manufactured by Seiko Chemical Co., Ltd.), "Q-1300 and 1301" (manufactured by Wako Pure Chemical Industries, Ltd.), and "GENORAD 16, 18, and 20" (manufactured by RAHN AG) as phosphorus compounds.

Among them, from the viewpoint of solubility in the ink and color of the inhibitor itself, it is preferable to select "BHT SWANOX" and "NONFLEX Alba" (all manufactured by Seiko Chemical Co., Ltd.) and "H-BHT" (manufactured by Honshu Chemical Industry Co., Ltd.) as a hindered phenol compound, "phenothiazine" (manufactured by Seiko Chemical Co., Ltd.) and "phenothiazine" (manufactured by Sakai Chemical Industry Co., Ltd.) as a phenothiazine compound, "HO-TEMPO" (manufactured by Evonik Degussa GmbH) as a hindered amine compound, and "triphenylphosphine" (manufactured by BASF) as a phosphorus compound. Since the isoindoline-based pigment of the present embodiment has a low pH value, a part of cation polymerizable monomer causes polymerization reaction and the storage stability is extremely deteriorated. Therefore, the hindered phenol compound, which is an antioxidant, is the most preferable.

The inhibitor may be used singly, or if necessary, two or more kinds may be used.

The amount of the inhibitor added in the ink is preferably 0.1% to 2% by weight, more preferably 0.1% to 1.5% by weight, and particularly preferably 0.1% to 1% by weight. When the amount of the inhibitor is within the above-described range, it is possible to achieve a balance between ink stability and curing property in high-speed printing. Moreover, it is possible to achieve a balance between ink stability and curing property in 1-pass type printing.

(Surface Tension Control Agent)

In order to improve wet spreadability to a base material, it is preferable to add a surface tension control agent. The "surface control agent" described in the present specification is a resin lowering ink surface tension by 0.5 mN/m or more when being added at an amount of 1% by weight to the ink.

Specific examples of the surface tension control agent include "BYK-350, 352, 354, 355, 358N, 361N, 381N, 381, 392, BYK-300, 302, 306, 307, 310, 315, 320, 322, 323, 325, 330, 331, 333, 337, 340, 344, 348, 370, 375, 377, 378, 355, 356, 357, 390, UV 3500, UV 3510, and UV 3570" manufactured by BYK-Chemie GmbH; "Tegorad-2100, 2200, 2250, 2500, and 2700" manufactured by Tego Chemie GmbH; and "TEGO (registered trademark) Glide 100, 110, 130, 403, 406, 410, 411, 415, 432, 435, 440, 450, and 482" manufactures by Evonik Degussa GmbH, but the examples are not limited to these.

The surface tension control agent may be used singly, or if necessary, two or more kinds may be used.

From the viewpoint of preventing flicking by compatibility, the surface tension control agent is preferably a silicone-based agent. Moreover, by concurrently using two or more kinds of silicone-based additives, good compatibility is maintained even when the ink is subjected to an acceleration test over time. Therefore, the ink is sufficiently spread on a base material and it is possible to maintain wide color reproducibility that is a feature of the pigment of the present embodiment. The "acceleration test over time" described herein is to evaluate the ink for a short period of time by storing the ink at a high temperature and then checking the ink quality before and after storing, as an alternative method to evaluate storage stability of the ink at room temperature for a long period of time.

The amount of the surface tension control agent added in the ink is preferably 0.01% to 6% by weight, more preferably 0.01% to 5% by weight, and particularly preferably 0.1% to 3% by weight. When the amount is 0.01% by weight or more, satisfactory wet spreadability is obtained, and when the amount is 6% by weight or less, the surface tension control agent is satisfactorily oriented at the ink interface and excellent effects are manifested.

(Organic Solvent)

Examples of the organic solvent include, although not particularly limited, glycol monoacetates such as ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, ethylene glycol monomethyl ether propionate, ethylene glycol monoethyl ether propionate, ethylene glycol monobutyl ether propionate, diethyl diglycol, diethylene glycol dialkyl ether, tetraethylene glycol dialkyl ether, diethylene glycol monomethyl ether propionate, diethylene glycol monoethyl ether propionate, diethylene glycol monobutyl ether propionate, propylene glycol monomethyl ether propionate, dipropylene glycol monomethyl ether propionate, ethylene glycol monomethyl ether butyrate, ethylene glycol monoethyl ether butyrate, ethylene glycol monobutyl ether butyrate, diethylene glycol monomethyl ether butyrate, diethylene glycol monoethyl ether butyrate, diethylene glycol monobutyl ether butyrate, propylene glycol monomethyl ether butyrate, and dipropylene glycol monomethyl ether butyrate;

glycol diacetates such as ethylene glycol diacetate, diethylene glycol diacetate, propylene glycol diacetate, dipropylene glycol diacetate, ethylene glycol acetate propionate, ethylene glycol acetate butyrate, ethylene glycol propionate butyrate, ethylene glycol dipropionate, ethylene glycol acetate dibutyrate, diethylene glycol acetate propionate, diethylene glycol acetate butyrate, diethylene glycol propionate butyrate, diethylene glycol dipropionate, diethylene glycol acetate dibutyrate, propylene glycol acetate propionate, propylene glycol acetate butyrate, propylene glycol propionate butyrate, propylene glycol dipropionate, propylene glycol acetate dibutyrate, dipropylene glycol acetate propionate, dipropylene glycol acetate butyrate, dipropylene glycol propionate butyrate, dipropylene glycol dipropionate, and dipropylene glycol acetate dibutyrate;

glycols such as ethylene glycol, diethylene glycol, triethylene glycol, propylene glycol, and dipropylene glycol;

glycol ethers such as ethylene glycol monobutyl ether, propylene glycol monomethyl ether, propylene glycol monobutyl ether, diethylene glycol monoethyl ether, diethylene glycol diethyl ether, diethylene glycol monobutyl ether, dipropylene glycol monomethyl ether, dipropylene glycol monoethyl ether, dipropylene glycol monobutyl ether, propylene glycol n-propyl ether, triethylene glycol monomethyl ether, triethylene glycol monoethyl ether, triethylene glycol monobutyl ether, and tripropylene glycol monomethyl ether; and lactic acid esters such as methyl lactate, ethyl lactate, propyl lactate, and butyl lactate.

Among them, in consideration of damage to a head, and the effect of odor, stimulation, or the like on human bodies, ethylene glycol monobutyl ether acetate, and diethylene glycol diethyl ether are preferable.

Since the curing properties are inhibited due to the addition of a large amount of the organic solvent, the amount of the organic solvent added in the ink is preferably 10% by weight or less, more preferably 7% by weight or less, and particularly preferably 3% by weight or less.

The organic solvent may be used singly, or if necessary, two or more kinds may be used.

In addition to the above-described additives, the ink of the present embodiment may contain a known additive such as an anti-foaming agent, a fluidity modifier, a fluorescent brightening agent, or an antioxidant, as long as the desired quality is satisfied.

The moisture content in the ink composition is preferably 5% by weight or less, more preferably 1% by weight or less, and particularly preferably 0.5% by weight or less. When the moisture content is within the above-described range, the isoindoline-based pigment has good dispersibility, and the ink has good discharge stability over time and is excellent in chroma as well. Therefore, the ink is excellent in the color reproducibility, which is a feature of the isoindoline-based pigment.

The ink composition of the present embodiment preferably has a viscosity of 5 to 14 mPa·sec at 25° C. When the viscosity is 5 mPa·sec or more, the ink composition has good dischargeability. When the viscosity is 14 mPa·sec or less, the ink composition is excellent in discharge accuracy and image quality. The ink composition more preferably has a viscosity of 8 to 12 mPa·sec in order to discharge the ink composition at high speed and at high frequency. The ink composition particularly preferably has a viscosity of 9 to 11 mPa·sec in order to maintain a uniform droplet size and to form a high-definition image.

EXAMPLES

Hereinafter, the invention is more specifically described with reference to Examples, but the following Examples are not intended to limit the scope of the invention at all. In Examples, the term "part(s)" means "part(s) by weight".

(Preparation of Isoindoline-Based Pigment)

An isoindoline pigment D was obtained based on the preparation method described in Example 1 in DE-A-2914086. In other words, 21 parts of the monoadduct of ethylene glycol with diaminoisoindoline, and 10 parts of N-methylcyanoacetamide were stirred with 300 parts of water and 30 parts of concentrated ammonia solution for 2 hours at 90° C. After the mixture was cooled to 60° C., the pH value thereof is brought to 2 with 20% sulfuric acid. 13 parts of barbituric acid was then added and stirring was continued for 2 hours at 90° C. The product was filtered off hot, washed with water to be neutral, and dried. As a result, 27 parts of the isoindoline pigment D, which is C. I. Pigment Yellow 185, was obtained.

100 g of the isoindoline pigment D was added to 2000 ml of methyl ethyl ketone and stirring was continued for 12 hours at 60° C. After pigment was filtered with a filter having a pore diameter of 1 μm under reduced pressure, the press cake was dried with a forced convection drying oven at 70° C. and was pulverized with an atomizer (mesh size: 0.8 mm) in order to prevent aggregation. As a result, an isoindoline pigment A was obtained.

The isoindoline pigment D obtained as described above was washed with methanol to obtain an isoindoline pigment B.

Further, 100 g of the press cake of C. I. Pigment Yellow 185 prepared according to Example 1 in DE-A-2914086 (dry content: approximately 50% by mass) was added to 1000 ml of tetrahydrofuran, and the mixture was stirred for 6 hours at 50° C. After pigment was filtered with a filter having a pore diameter of 1 μm under reduced pressure, the press cake was dried with a forced convection drying oven at 70° C. and was pulverized with an atomizer (mesh size: 0.8 mm) in order to prevent aggregation. As a result, an isoindoline pigment C was obtained.

Regarding the obtained isoindoline pigments A to D, the concentration of the pigment precursor and the by-product thereof was measured according to the above-described test method. The measurement result is listed in Table 2.

(Preparation of Pigment Dispersing Aid)

A pigment dispersing aid A described in Table 1 was synthesized based on Preparation Example 1 in Japanese Patent No. 4407128 and a pigment dispersing aid B described in Table 1 was synthesized according to the preparation example in Japanese Patent No. 4407128. The compound No. XI described in JP 56-81371 A was used as a pigment dispersing aid C. A pigment dispersing aid D (in JP 2010-180376 A, it is expressed as the compound A) was synthesized based on a known preparation method which is executed in JP 2010-180376 A.

The entire contents of the present specification are hereby incorporated by reference to DE-A-2914086, Japanese Patent No. 4407128, JP 56-81371 A, and JP 2010-180376 A which are described above.

(Preparation of Pigment Dispersion Element)

Raw materials described in Table 2 were mixed according to the following mixing amount and then dispersed using a microbead-type dispersing machine (DCP mill) for 1 hour to obtain pigment dispersion elements 1 to 17. The dispersion was performed by using 0.5-mm-diameter-type Zr beads at a volume filling rate of 75%.

TABLE 1

| Pigment Dispersing Aid | Structure | Salt Formation Product |
|---|---|---|
| A | Benzimidazolone-NH-triazine with two NH(CH2)2SO3H groups | Aluminum |
| B | Benzimidazolone-NH-triazine with NH-phenyl-SO3H and NH-phenyl groups | Lauryl Ammonium |
| C | Anthraquinone-C(O)NH-phenyl-SO3Al$_{1/3}$ | |

TABLE 2

| | Raw Material | Concentration of Pigment Precursor and By-Product Thereof in Pigment | Pigment Dispersion Element 1 | 2 | 3 | 4 | 5 | 6 | 7 | 8 | 9 |
|---|---|---|---|---|---|---|---|---|---|---|---|
| Pigment | Pigment A | 1.0% | 20 | 20 | 20 | 20 | 20 | 20 | 20 | 20 | 20 |
| | Pigment B | 2.8% | | | | | | | | | |
| | Pigment C | 4.7% | | | | | | | | | |
| | Pigment D | 7.3% | | | | | | | | | |
| | Pariotol Yellow D1155 | 8.0% | | | | | | | | | |
| Pigment Dispersing Agent | Pigment Dispersing Aid A | | 2 | 2 | 2 | 1 | | | | 2 | 2 |
| | Pigment Dispersing Aid B | | | | | | 2 | | | | |
| | Pigment Dispersing Aid C | | | | | | | 2 | | | |
| | Pigment Dispersing Aid D | | | | | | | | 2 | | |
| | Solsperse 32000 | | 7 | 10 | 19 | | | | | | |
| | Solsperse 35000 | | | | | 10 | 10 | 10 | 10 | | |
| | AJISPER PB821 | | | | | | | | | 10 | |
| | BYK-168 | | | | | | | | | | 10 |
| Monomer | DPGDA | | 71 | 68 | 59 | 69 | 68 | 68 | 68 | 68 | 68 |
| | VEEA | | | | | | | | | | |
| | TPGDA | | | | | | | | | | |
| | Aronix M-120 | | | | | | | | | | |
| | PEA | | | | | | | | | | |
| Total | | | 100 | 100 | 100 | 100 | 100 | 100 | 100 | 100 | 100 |

| | Raw Material | Concentration of Pigment Precursor and By-Product Thereof in Pigment | Pigment Dispersion Element 10 | 11 | 12 | 13 | 14 | 15 | 16 | 17 |
|---|---|---|---|---|---|---|---|---|---|---|
| Pigment | Pigment A | 1.0% | | | 20 | 20 | 20 | 20 | | |
| | Pigment B | 2.8% | 20 | | | | | | | |
| | Pigment C | 4.7% | | 20 | | | | | | |
| | Pigment D | 7.3% | | | | | | | 20 | |
| | Pariotol Yellow D1155 | 8.0% | | | | | | | | 20 |
| Pigment Dispersing Agent | Pigment Dispersing Aid A | | 2 | 2 | 2 | 2 | 2 | 2 | 2 | 2 |
| | Pigment Dispersing Aid B | | | | | | | | | |
| | Pigment Dispersing Aid C | | | | | | | | | |
| | Pigment Dispersing Aid D | | | | | | | | | |

TABLE 2-continued

|  |  | | | | | | | | | |
|---|---|---|---|---|---|---|---|---|---|---|
|  | Solsperse 32000 | 10 | 10 | 10 | 10 | 10 | 10 | 10 | 10 |
|  | Solsperse 35000 | | | | | | | | |
|  | AJISPER PB821 | | | | | | | | |
|  | BYK-168 | | | | | | | | |
| Monomer | DPGDA | 68 | 68 | | | | | 68 | 68 |
|  | VEEA | | | 68 | | | | | |
|  | TPGDA | | | | 68 | | | | |
|  | Aronix M-120 | | | | | 68 | | | |
|  | PEA | | | | | | 68 | | |
| Total | | 100 | 100 | 100 | 100 | 100 | 100 | 100 | 100 |

(Preparation of Ink)

According to the mixing amount described in Table 3, a monomer was slowly added to each of the pigment dispersion elements and stirred. Thereafter, an initiator, an inhibitor, an additive were added respectively and shaken for 6 hours with a shaker so as to be dissolved. The obtained liquid was filtered through a PTFE filter with a pore size of 0.5 μm so that coarse particles were removed. Each ink to be evaluated was prepared (Examples 1 to 24 and Comparative Examples 1 and 2).

<Description of Raw Materials>

DPGDA: dipropylene glycol diacrylate

VEEA: 2-(2-vinyloxyethoxy)ethyl acrylate

TPGDA: tripropylene glycol diacrylate

Aronix M-120: EO-modified 2-ethylhexyl acrylate (n≈2)

PEA: phenoxy ethyl acrylate

VCAP: N-vinylcaprolactam

DVE-3: triethylene glycol divinyl ether

LA: lauryl acrylate

Lucirin TPO: 2,4,6-trimethylbenzoyl-diphenyl-phosphine oxide

Irg819: bis(2,4,6-trimethylbenzoyl)-phenylphosphine oxide

Irg907: 2-methyl-1-(4-methylthiophenyl)-2-morpholino propane-1-one

KAYACURE BMS: [4-[(4-methylphenyl)thio]phenyl] phenyl methanone

EPA: 4-(dimethylamino)ethyl benzoate

EAB: 4,4'-bis-(dimethylamino)benzophenone

BHT: dibutyl hydroxy toluene

Phenothiazine: manufactured by Seiko Chemical Co., Ltd.

UV 3510: BYK-UV 3510 manufactured by BYK Japan KK, polyether modified polydimethylsiloxane Tego 450: Tego Glide 450 manufactured by Evonic Industries AG, a polyether modified siloxane copolymer BYK-348: manufactured by BYK Japan KK, polyether modified siloxane Solsperse 32000: manufactured by Lubrizol Corporation, polymer dispersant Solsperse 35000: manufactured by Lubrizol Corporation, polymer dispersant AJISPER PB821: manufactured by Ajinomoto Fine-Techno Co., Inc., a basic functional group-containing copolymer BYK-168: manufactured by BYK Japan KK, a solution of a high-molecular-weight block copolymer (Viscosity)

The viscosity of each prepared ink was measured by using an E-type viscometer manufactured by TOKI SANGYO Co., Ltd. Under the measurement conditions, the rotational speed was adjusted to the desired value suitable for the measurement in a 25° C. circulating chiller environment, and after the adjustment, the measured value after 3 minutes was used as viscosity.

⊙: 9≤viscosity≤11 mPa·s

○: 8≤viscosity<9, 11<viscosity≤12 mPa·s x: 8>viscosity, 12<viscosity (Ink Stability)

A rate of change in viscosity was determined after an acceleration test over time at 60° C. for 1 week. The rate of change in viscosity was calculated by the formula {(a value of the viscosity after the storage at 60° C. for 1 week)−(the initial value of the viscosity)}/(the initial value of the viscosity)×100, which is an indication of the storage stability of ink. The values of ○ or more were determined to be acceptable levels of ink stability for practical use.

⊙: The rate of change in viscosity was less than 5%.

○: The rate of change in viscosity was from 5% to less than 10%.

x: The rate of change in viscosity was 10% or more.

(Dischargeability)

The dischargeability was evaluated by observing how each ink was discharged from a head (KJ4A) manufactured by KYOCERA Corporation through electronic flash photography. Fire 1 mode was selected for the waveform. The temperature of the head at the time of discharge was uniformly set to 40° C.

At the following time point, the evaluation was performed as described below. At the frequency 20 kHz, how droplets were broken up was observed at the start of discharge and after continuous discharge for 10 minutes.

The state of droplets was observed at points 1 mm and 2 mm apart from the discharge point. It is preferable that droplets be stable without being broken up. The values of ○ or more were determined to be acceptable levels of dischargeability for practical use.

⊙: Droplets were not broken up and were continuous until they reached the 2 mm point. Droplets were stable.

○: Droplets were broken up at the 1 mm point, but gathered at the 2 mm point. Otherwise, the broken state was significantly changed from the beginning.

x: Droplets were broken up at the 1 mm point, and still not gathered at the 2 mm point. Discharge failure occurred at the beginning or after 10 minutes.

(Continuous Dischargeability)

Similarly to the evaluation of dischargeability, how droplets were broken up was observed by discharging each ink at the frequency 20 kHz using a head (KJ4A) manufactured by KYOCERA Corporation. As a discharge method, a process of continuous discharge for 12 hours and then stop of discharge for 12 hours was repeated for 1 week. The temperature of the head at the time of discharge was uniformly set to 40° C.

The evaluation was performed such that discharge was started again thereafter at the frequency 20 kHz and how droplets were broken up was observed at the start of discharge and after continuous discharge for 10 minutes.

The state of droplets was observed at points 1 mm and 2 mm apart from the discharge point. It is preferable that droplets be stable without being broken up. The values of ○ or more were determined to be acceptable levels of dischargeability for practical use.

⊙: Droplets were not broken up and were continuous until they reached the 2 mm point. Droplets were stable.

○: Droplets were broken up at the 1 mm point, but gathered at the 2 mm point. Otherwise, the broken state was significantly changed from the beginning.

x: Droplets were broken up at the 1 mm point, and still not gathered at the 2 mm point. Discharge failure occurred at the beginning or after 10 minutes.

(Deflection and Non-Discharge)

Each of the adjusted inks was subjected to evaluation of printing with an ink droplet size of 14 pl using a single pass-type inkjet printer (manufactured by Tritek Co., Ltd.). This printer has a discharge mechanism equipped with a head (KJ4A) manufactured by KYOCERA Corporation, a mechanism including a conveyer unit for transporting the printed material at the desired speed, and a mechanism for subsequently irradiating the printed material with a UV lamp. A metal halide lamp of 140 W/cm manufactured by Nordson Corporation was used as the UV lamp. The temperature of the head at the time of discharge was uniformly set to 40° C. OK Top Coat N (manufactured by Oji Paper Co., Ltd.) was used as a printing base material.

A process in which 100 sheets were printed every day, then, the head was covered with a cap to be left to stand while the inside of the head was filled with ink, and 100 sheets were printed again on the following day was repeated for 1 week.

The evaluation was performed such that a nozzle check pattern was printed thereafter and deflection and nozzle-out were evaluated. The values of ○ or more were determined to be acceptable levels of deflection and non-discharge for practical use.

⊙: There was neither deflection nor non-discharge.

○: There was deflection in 1 to 5 nozzles.

x: There was deflection in 6 or more nozzles and/or there was non-discharge in 1 or more nozzles.

(Curing Property)

The curing property was evaluated under the same conditions as described above from the prints obtained by using a single pass-type inkjet printer (manufactured by Tritek Co., Ltd.).

The curing property was determined by a finger rubbing method when the conveyor speed was changed to 50 m/min. The values of ○ or more were determined to be acceptable levels of curing property for practical use.

⊙: The print was not blurred even when rubbed strongly.

○: The print was cured, but slightly blurred when rubbed strongly.

x: The print is not cured (Fingers are stained with ink).

The evaluation result is listed in Table 3. Examples 1 to 24 were excellent in viscosity, ink stability, dischargeability, continuous dischargeability, deflection/non-discharge, and curing properties. Among them, Examples 1 to 6, 10, 12, 16, 18, 20, and 21 exhibited good physical properties in all of items, and these Examples were an ink with high quality, high productivity, and high reliability which is excellent in ejection characteristics over a long time and achieves a balance between high color reproducibility and high curing property. On the other hand, Comparative Examples 1 and 2 used PY185 having higher than 5% by weight of the concentration of the pigment precursor and by-product thereof in the pigment, but these Comparative Examples exhibited bad quality in viscosity, ink stability, dischargeability, continuous dischargeability, deflection/non-discharge, curing properties. Therefore, it was not possible to obtain an ink with high quality.

TABLE 3

| Ink Composition | | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 |
|---|---|---|---|---|---|---|---|---|---|---|---|---|---|---|
| Pigment Dispersion Element | 1 | 10 | | | | | | | | | | | | |
| | 2 | | 10 | | | | | | | | | | | |
| | 3 | | | 10 | | | | | | | | | | |
| | 4 | | | | 10 | | | | | | | | | |
| | 5 | | | | | 10 | | | | | | | | |
| | 6 | | | | | | 10 | | | | | | | |
| | 7 | | | | | | | 10 | | | | | | |
| | 8 | | | | | | | | 10 | | | | | |
| | 9 | | | | | | | | | 10 | | | | |
| | 10 | | | | | | | | | | 10 | | | |
| | 11 | | | | | | | | | | | 10 | | |
| | 12 | | | | | | | | | | | | 10 | |
| | 13 | | | | | | | | | | | | | 10 |
| | 14 | | | | | | | | | | | | | |
| | 15 | | | | | | | | | | | | | |
| | 16 | | | | | | | | | | | | | |
| | 17 | | | | | | | | | | | | | |
| Monomer | DPGDA | 40 | 40 | 40 | 40 | 40 | 40 | 40 | 40 | 40 | 40 | 40 | 40 | 40 |
| | VEEA | 20 | 20 | 20 | 20 | 20 | 20 | 20 | 20 | 20 | 20 | 20 | 20 | 20 |
| | DVE-3 | | | | | | | | | | | | | |
| | LA | 6.4 | 6.4 | 6.4 | 6.4 | 6.4 | 6.4 | 6.4 | 6.4 | 6.4 | 6.4 | 6.4 | 6.4 | 6.4 |
| | PEA | 5 | 5 | 5 | 5 | 5 | 5 | 5 | 5 | 5 | 5 | 5 | 5 | 5 |
| | VCAP | 5 | 5 | 5 | 5 | 5 | 5 | 5 | 5 | 5 | 5 | 5 | 5 | 5 |
| Initiator | Lucirin TPO | 3 | 3 | 3 | 3 | 3 | 3 | 3 | 3 | 3 | 3 | 3 | 3 | 3 |
| | Irg819 | 3 | 3 | 3 | 3 | 3 | 3 | 3 | 3 | 3 | 3 | 3 | 3 | 3 |
| | Irg907 | | | | | | | | | | | | | |
| | KAYACURE BMS | 3 | 3 | 3 | 3 | 3 | 3 | 3 | 3 | 3 | 3 | 3 | 3 | 3 |
| | EPA | 3 | 3 | 3 | 3 | 3 | 3 | 3 | 3 | 3 | 3 | 3 | 3 | 3 |
| | EAB | | | | | | | | | | | | | |

TABLE 3-continued

| | | | | | | | | | | | | | | |
|---|---|---|---|---|---|---|---|---|---|---|---|---|---|---|
| Inhibitor | BHT | 0.5 | 0.5 | 0.5 | 0.5 | 0.5 | 0.5 | 0.5 | 0.5 | 0.5 | 0.5 | 0.5 | 0.5 | 0.5 |
| | Phenothiazine | 0.1 | 0.1 | 0.1 | 0.1 | 0.1 | 0.1 | 0.1 | 0.1 | 0.1 | 0.1 | 0.1 | 0.1 | 0.1 |
| Additive | UV3510 | 0.5 | 0.5 | 0.5 | 0.5 | 0.5 | 0.5 | 0.5 | 0.5 | 0.5 | 0.5 | 0.5 | 0.5 | 0.5 |
| | Tego 450 | 0.5 | 0.5 | 0.5 | 0.5 | 0.5 | 0.5 | 0.5 | 0.5 | 0.5 | 0.5 | 0.5 | 0.5 | 0.5 |
| | BYK348 | | | | | | | | | | | | | |
| Total | | 100 | 100 | 100 | 100 | 100 | 100 | 100 | 100 | 100 | 100 | 100 | 100 | 100 |
| Evaluation | Viscosity | ⊙ | ⊙ | ⊙ | ⊙ | ⊙ | ⊙ | ○ | ⊙ | ⊙ | ⊙ | ⊙ | ⊙ | ○ |
| | Ink Stability | ⊙ | ⊙ | ⊙ | ⊙ | ⊙ | ⊙ | ○ | ○ | ○ | ⊙ | ○ | ⊙ | ⊙ |
| | Dischargeability | ⊙ | ⊙ | ⊙ | ⊙ | ⊙ | ⊙ | ○ | ⊙ | ⊙ | ⊙ | ⊙ | ⊙ | ⊙ |
| | Continuous Dischargeability | ⊙ | ⊙ | ⊙ | ⊙ | ⊙ | ⊙ | ○ | ○ | ○ | ⊙ | ⊙ | ⊙ | ○ |
| | Deflection and Non-Discharge | ⊙ | ⊙ | ⊙ | ⊙ | ⊙ | ⊙ | ⊙ | ⊙ | ⊙ | ⊙ | ○ | ⊙ | ⊙ |
| | Curing Property | ⊙ | ⊙ | ⊙ | ⊙ | ⊙ | ⊙ | ⊙ | ⊙ | ⊙ | ⊙ | ○ | ⊙ | ⊙ |

| Ink Composition | | Ex. 14 | Ex. 15 | Ex. 16 | Ex. 17 | Ex. 18 | Ex. 19 | Ex. 20 | Ex. 21 | Ex. 22 | Ex. 23 | Ex. 24 | Com. Ex. 1 | Com. Ex. 2 |
|---|---|---|---|---|---|---|---|---|---|---|---|---|---|---|
| Pigment Dispersion Element | 1 | | | 5 | 20 | | | | | | | | | |
| | 2 | | | | | 10 | 10 | 10 | 10 | 10 | 10 | 10 | | |
| | 3 | | | | | | | | | | | | | |
| | 4 | | | | | | | | | | | | | |
| | 5 | | | | | | | | | | | | | |
| | 6 | | | | | | | | | | | | | |
| | 7 | | | | | | | | | | | | | |
| | 8 | | | | | | | | | | | | | |
| | 9 | | | | | | | | | | | | | |
| | 10 | | | | | | | | | | | | | |
| | 11 | | | | | | | | | | | | | |
| | 12 | | | | | | | | | | | | | |
| | 13 | | | | | | | | | | | | | |
| | 14 | 10 | | | | | | | | | | | | |
| | 15 | | 10 | | | | | | | | | | | |
| | 16 | | | | | | | | | | | | 10 | |
| | 17 | | | | | | | | | | | | | 10 |
| Monomer | DPGDA | 40 | 40 | 45 | 30 | 40 | 40 | | 20 | | 20 | 40.6 | 40 | 40 |
| | VEEA | 20 | 20 | 20 | 20 | 10 | 24 | 35 | 50 | 20 | 50 | 20 | 20 | 20 |
| | DVE-3 | | | | | 5 | | | | | | | | |
| | LA | 6.4 | 6.4 | 6.4 | 6.4 | 6.4 | 6.4 | 17.4 | | 10 | | 6.4 | 6.4 | 6.4 |
| | PEA | 5 | 5 | 5 | 5 | 5 | 5 | 10 | | 16.4 | | 5 | 5 | 5 |
| | VCAP | 5 | 5 | 5 | 5 | 10 | 1 | 14 | 2.4 | 30 | 2.4 | 5 | 5 | 5 |
| Initiator | Lucirin TPO | 3 | 3 | 3 | 3 | 3 | 3 | 3 | 10 | 3 | | 3 | 3 | 3 |
| | Irg819 | 3 | 3 | 3 | 3 | 3 | 3 | 3 | | 3 | | 3 | 3 | 3 |
| | Irg907 | | | | | | | | | | 10 | | | |
| | KAYACURE BMS | 3 | 3 | 3 | 3 | 3 | 3 | 3 | 3 | 3 | 3 | 3 | 3 | 3 |
| | EPA | 3 | 3 | 3 | 3 | 3 | 3 | 3 | | 3 | | 3 | 3 | 3 |
| | EAB | | | | | | | | 3 | | | | | |
| Inhibitor | BHT | 0.5 | 0.5 | 0.5 | 0.5 | 0.5 | 0.5 | 0.5 | 0.5 | 0.5 | 0.5 | | 0.5 | 0.5 |
| | Phenothiazine | 0.1 | 0.1 | 0.1 | 0.1 | 0.1 | 0.1 | 0.1 | 0.1 | 0.1 | 0.1 | | 0.1 | 0.1 |
| Additive | UV3510 | 0.5 | 0.5 | 0.5 | 0.5 | 0.5 | 0.5 | 0.5 | 0.5 | 0.5 | 0.5 | 0.5 | 0.5 | 0.5 |
| | Tego 450 | 0.5 | 0.5 | 0.5 | 0.5 | 0.5 | 0.5 | 0.5 | 0.5 | 0.5 | 0.5 | | 0.5 | 0.5 |
| | BYK348 | | | | | | | | | | | 0.5 | | |
| Total | | 100 | 100 | 100 | 100 | 100 | 100 | 100 | 100 | 100 | 100 | 100 | 100 | 100 |
| Evaluation | Viscosity | ○ | ○ | ⊙ | ⊙ | ⊙ | ⊙ | ⊙ | ⊙ | ⊙ | ⊙ | ⊙ | X | X |
| | Ink Stability | ⊙ | ⊙ | ⊙ | ⊙ | ○ | ⊙ | ⊙ | ⊙ | ⊙ | ⊙ | ○ | X | X |
| | Dischargeability | ⊙ | ⊙ | ⊙ | ⊙ | ⊙ | ⊙ | ⊙ | ⊙ | ⊙ | ⊙ | ⊙ | X | X |
| | Continuous Dischargeability | ○ | ○ | ⊙ | ⊙ | ⊙ | ⊙ | ⊙ | ⊙ | ⊙ | ⊙ | ○ | X | X |
| | Deflection and Non-Discharge | ⊙ | ⊙ | ⊙ | ○ | ⊙ | ○ | ⊙ | ⊙ | ⊙ | ⊙ | ⊙ | X | X |
| | Curing Property | ⊙ | ⊙ | ⊙ | ○ | ⊙ | ○ | ⊙ | ○ | ○ | ⊙ | ⊙ | X | X |

(Preparation of Isoindoline-Based Pigment)

As the isoindoline-based pigment, C. I. Pigment 185 was synthesized based on Example 1 described in DE-A-2914086. The specific electric conductance of each pigment was controlled according to a type of reaction medium of semicondensate (Halbkondensat), a type of medium used in crystallization procedure, and temperature, time or the like at the time of thermal processing to prepare isoindoline-based pigments A' to F' having various electric conductivities. Further, the measurement method of electric conductance was the same as described above.

(Preparation of Pigment Dispersing Aid)

As described above, pigment dispersing aids A to D described in Table 1 were prepared.

TABLE 4

| | Raw Material | Electric Conductance | Pigment Dispersion Element | | | | | | | | | |
|---|---|---|---|---|---|---|---|---|---|---|---|---|
| | | | 1' | 2' | 3' | 4' | 5' | 6' | 7' | 8' | 9' | 10' |
| Pigment | Pariotol Yellow D1157ET | 90 | 20 | 20 | 20 | 20 | 20 | 20 | 20 | 20 | 20 | |
| | Pigment A' | 50 | | | | | | | | | | 20 |
| | Pigment B' | 70 | | | | | | | | | | |
| | Pigment C' | 120 | | | | | | | | | | |
| | Pigment D' | 140 | | | | | | | | | | |
| | Pigment E' | 170 | | | | | | | | | | |
| | Pigment F' | 200 | | | | | | | | | | |
| Pigment Dispersing Agent | Pigment Dispersing Aid A | | 2 | 2 | 2 | 1 | | | | 2 | 2 | 2 |
| | Pigment Dispersing Aid B | | | | | | 2 | | | | | |
| | Pigment Dispersing Aid C | | | | | | | 2 | | | | |
| | Pigment Dispersing Aid D | | | | | | | | 2 | | | |
| | Solsperse 32000 | | 7 | 10 | 19 | | | | | | | 10 |
| | Solsperse 35000 | | | | | 10 | 10 | 10 | 10 | | | |
| | AJISPER PB821 | | | | | | | | | 10 | | |
| | BYK-168 | | | | | | | | | | 10 | |
| Monomer | DPGDA | | 71 | 68 | 59 | 69 | 68 | 68 | 68 | 68 | 68 | 68 |
| | VEEA | | | | | | | | | | | |
| | TPGDA | | | | | | | | | | | |
| | Aronix M-120 | | | | | | | | | | | |
| | PEA | | | | | | | | | | | |
| Total | | | 100 | 100 | 100 | 100 | 100 | 100 | 100 | 100 | 100 | 100 |

| | Raw Material | Electric Conductance | Pigment Dispersion Element | | | | | | | | |
|---|---|---|---|---|---|---|---|---|---|---|---|
| | | | 11' | 12' | 13' | 14' | 15' | 16' | 17' | 18' | 19' |
| Pigment | Pariotol Yellow D1157ET | 90 | | | | 20 | 20 | 20 | 20 | | |
| | Pigment A' | 50 | | | | | | | | | |
| | Pigment B' | 70 | 20 | | | | | | | | |
| | Pigment C' | 120 | | 20 | | | | | | | |
| | Pigment D' | 140 | | | 20 | | | | | | |
| | Pigment E' | 170 | | | | | | | | 20 | |
| | Pigment F' | 200 | | | | | | | | | 20 |
| Pigment Dispersing Agent | Pigment Dispersing Aid A | | 2 | 2 | 2 | 2 | 2 | 2 | 2 | 2 | 2 |
| | Pigment Dispersing Aid B | | | | | | | | | | |
| | Pigment Dispersing Aid C | | | | | | | | | | |
| | Pigment Dispersing Aid D | | | | | | | | | | |
| | Solsperse 32000 | | 10 | 10 | 10 | 10 | 10 | 10 | 10 | 10 | 10 |
| | Solsperse 35000 | | | | | | | | | | |
| | AJISPER PB821 | | | | | | | | | | |
| | BYK-168 | | | | | | | | | | |
| Monomer | DPGDA | | 68 | 68 | 68 | | | | | 68 | 68 |
| | VEEA | | | | | 68 | | | | | |
| | TPGDA | | | | | | 68 | | | | |
| | Aronix M-120 | | | | | | | 68 | | | |
| | PEA | | | | | | | | 68 | | |
| Total | | | 100 | 100 | 100 | 100 | 100 | 100 | 100 | 100 | 100 |

(Preparation of Pigment Dispersion Element)

Raw materials described in Table 4 were mixed according to the following mixing amount and then dispersed using a microbead-type dispersing machine (DCP mill) for 1 hour to obtain pigment dispersion elements 1' to 19'. The dispersion was performed by using 0.5-mm-diameter-type Zr beads at a volume filling rate of 75%.

(Preparation of Ink)

According to the mixing amount described in Table 5, a monomer was slowly added to each of the pigment dispersion elements and stirred. Thereafter, an initiator, an inhibitor, an additive were added respectively and shaken for 6 hours with a shaker so as to be dissolved. The obtained liquid was filtered through a PTFE filter with a pore size of 0.5 μm so that coarse particles were removed. Each ink to be evaluated was prepared (Examples 1' to 26' and Comparative Examples 1' and 2').

<Description of Raw Materials>

The description is the same as described above.

(Viscosity)

The measurement conditions and the evaluation method were the same as described above.

(Ink Stability)

The measurement conditions and the evaluation method were the same as described above.

(Dischargeability)

The dischargeability was evaluated by observing how each ink was discharged from a head (KJ4A) manufactured by KYOCERA Corporation through electronic flash photography. Fire 1 mode was selected for the waveform. The temperature of the head at the time of discharge was uniformly set to 40° C.

At the following time points, the evaluation was performed as described below. In a case where the frequency was changed to 5 kHz and 20 kHz, how droplets were broken up was observed at the start of discharge and after continuous discharge for 10 minutes.

The state of droplets was observed at points 1 mm and 2 mm apart from the discharge point. It is preferable that droplets be stable without being broken up. The values of ∘ or more were determined to be acceptable levels of dischargeability for practical use.

⊙: Droplets were continuous and are not broken up until they reach the 2 mm point. Droplets were stable.

○: Droplets were broken up at the 1 mm point, but gathered at the 2 mm point. Otherwise, the broken state was significantly changed from the beginning.

x: Droplets were broken up at the 1 mm point, and still not gathered at the 2 mm point. Discharge failure occurred at the beginning or after 10 minutes.

(Continuous Dischargeability)

The measurement conditions and the evaluation method were the same as described above.

(Curing Property)

The measurement conditions and the evaluation method were the same as described above.

The evaluation result was listed in Table 5. Examples 1' to 26' were excellent in ink stability, dischargeability (5 kHz), dischargeability (20 kHz), continuous dischargeability, and curing properties. Among them, Examples 1' to 6', 10', 11', 14', and 18' to 23' exhibited good physical properties in all of items, and these Examples were a 1 pass-curable ink which is excellent in ejection characteristics when the printing is performed at high frequency and at high ejection speed, and achieves a balance between high color reproducibility and high curing property. On the other hand, Comparative Examples 1' and 2' used PY185 having higher than 150 μS of specific electric conductance, but these Comparative Examples exhibited bad quality in ink stability, dischargeability (20 kHz), continuous dischargeability, curing properties. Therefore, it was not possible to obtain an ink suitable for 1-pass high-speed curing.

TABLE 5

| Ink Composition | | Ex. 1' | Ex. 2' | Ex. 3' | Ex. 4' | Ex. 5' | Ex. 6' | Ex. 7' | Ex. 8' | Ex. 9' | Ex. 10' | Ex. 11' | Ex. 12' | Ex. 13' | Ex. 14' |
|---|---|---|---|---|---|---|---|---|---|---|---|---|---|---|---|
| Pigment | 1' | 10 | | | | | | | | | | | | | |
| Dispersion | 2' | | 10 | | | | | | | | | | | | |
| Element | 3' | | | 10 | | | | | | | | | | | |
| | 4' | | | | 10 | | | | | | | | | | |
| | 5' | | | | | 10 | | | | | | | | | |
| | 6' | | | | | | 10 | | | | | | | | |
| | 7' | | | | | | | 10 | | | | | | | |
| | 8' | | | | | | | | 10 | | | | | | |
| | 9' | | | | | | | | | 10 | | | | | |
| | 10' | | | | | | | | | | 10 | | | | |
| | 11' | | | | | | | | | | | 10 | | | |
| | 12' | | | | | | | | | | | | 10 | | |
| | 13' | | | | | | | | | | | | | 10 | |
| | 14' | | | | | | | | | | | | | | 10 |
| | 15' | | | | | | | | | | | | | | |
| | 16' | | | | | | | | | | | | | | |
| | 17' | | | | | | | | | | | | | | |
| | 18' | | | | | | | | | | | | | | |
| | 19' | | | | | | | | | | | | | | |
| Monomer | DPGDA | 40 | 40 | 40 | 40 | 40 | 40 | 40 | 40 | 40 | 40 | 40 | 40 | 40 | 40 |
| | VEEA | 20 | 20 | 20 | 20 | 20 | 20 | 20 | 20 | 20 | 20 | 20 | 20 | 20 | 20 |
| | DVE-3 | | | | | | | | | | | | | | |
| | LA | 6.4 | 6.4 | 6.4 | 6.4 | 6.4 | 6.4 | 6.4 | 6.4 | 6.4 | 6.4 | 6.4 | 6.4 | 6.4 | 6.4 |
| | PEA | 5 | 5 | 5 | 5 | 5 | 5 | 5 | 5 | 5 | 5 | 5 | 5 | 5 | 5 |
| | VCAP | 5 | 5 | 5 | 5 | 5 | 5 | 5 | 5 | 5 | 5 | 5 | 5 | 5 | 5 |
| Initiator | Lucirin TPO | 3 | 3 | 3 | 3 | 3 | 3 | 3 | 3 | 3 | 3 | 3 | 3 | 3 | 3 |
| | Irg819 | 3 | 3 | 3 | 3 | 3 | 3 | 3 | 3 | 3 | 3 | 3 | 3 | 3 | 3 |
| | Irg907 | | | | | | | | | | | | | | |
| | KAYACURE BMS | 3 | 3 | 3 | 3 | 3 | 3 | 3 | 3 | 3 | 3 | 3 | 3 | 3 | 3 |
| | EPA | 3 | 3 | 3 | 3 | 3 | 3 | 3 | 3 | 3 | 3 | 3 | 3 | 3 | 3 |
| | EAB | | | | | | | | | | | | | | |
| Inhibitor | BHT | 0.5 | 0.5 | 0.5 | 0.5 | 0.5 | 0.5 | 0.5 | 0.5 | 0.5 | 0.5 | 0.5 | 0.5 | 0.5 | 0.5 |
| | Phenothiazine | 0.1 | 0.1 | 0.1 | 0.1 | 0.1 | 0.1 | 0.1 | 0.1 | 0.1 | 0.1 | 0.1 | 0.1 | 0.1 | 0.1 |
| Additive | UV3510 | 0.5 | 0.5 | 0.5 | 0.5 | 0.5 | 0.5 | 0.5 | 0.5 | 0.5 | 0.5 | 0.5 | 0.5 | 0.5 | 0.5 |
| | Tego 450 | 0.5 | 0.5 | 0.5 | 0.5 | 0.5 | 0.5 | 0.5 | 0.5 | 0.5 | 0.5 | 0.5 | 0.5 | 0.5 | 0.5 |
| | BYK348 | | | | | | | | | | | | | | |
| Total | | 100 | 100 | 100 | 100 | 100 | 100 | 100 | 100 | 100 | 100 | 100 | 100 | 100 | 100 |
| Evaluation | Viscosity | ⊙ | ⊙ | ⊙ | ⊙ | ⊙ | ⊙ | ○ | ⊙ | ⊙ | ⊙ | ⊙ | ⊙ | ⊙ | ⊙ |
| | Ink Stability | ⊙ | ⊙ | ⊙ | ⊙ | ⊙ | ⊙ | ○ | ○ | ○ | ⊙ | ⊙ | ⊙ | ⊙ | ⊙ |
| | Dischargeability (5 kHz) | ⊙ | ⊙ | ⊙ | ⊙ | ⊙ | ⊙ | ⊙ | ⊙ | ⊙ | ⊙ | ⊙ | ⊙ | ⊙ | ⊙ |
| | Dischargeability (20 kHz) | ⊙ | ⊙ | ⊙ | ⊙ | ⊙ | ⊙ | ○ | ○ | ○ | ⊙ | ⊙ | ○ | ○ | ○ |
| | Continuous Dischargeability | ⊙ | ⊙ | ⊙ | ⊙ | ⊙ | ⊙ | ○ | ○ | ○ | ⊙ | ⊙ | ○ | ○ | ○ |
| | Curing Property | ⊙ | ⊙ | ⊙ | ⊙ | ⊙ | ⊙ | ⊙ | ⊙ | ⊙ | ⊙ | ⊙ | ⊙ | ⊙ | ⊙ |

| Ink Composition | | Ex. 15' | Ex. 16' | Ex. 17' | Ex. 18' | Ex. 19' | Ex. 20' | Ex. 21' | Ex. 22' | Ex. 23' | Ex. 24' | Ex. 25' | Ex. 26' | Com. Ex. 1' | Com. Ex. 2' |
|---|---|---|---|---|---|---|---|---|---|---|---|---|---|---|---|
| Pigment | 1' | | | | 5 | 25 | | | | | | | | | |
| Dispersion | 2' | | | | | | 10 | 10 | 10 | 10 | 10 | 10 | 10 | | |
| Element | 3' | | | | | | | | | | | | | | |
| | 4' | | | | | | | | | | | | | | |
| | 5' | | | | | | | | | | | | | | |

TABLE 5-continued

|  |  | 6' | | | | | | | | | | | | | |
|---|---|---|---|---|---|---|---|---|---|---|---|---|---|---|---|
|  |  | 7' | | | | | | | | | | | | | |
|  |  | 8' | | | | | | | | | | | | | |
|  |  | 9' | | | | | | | | | | | | | |
|  |  | 10' | | | | | | | | | | | | | |
|  |  | 11' | | | | | | | | | | | | | |
|  |  | 12' | | | | | | | | | | | | | |
|  |  | 13' | | | | | | | | | | | | | |
|  |  | 14' | | | | | | | | | | | | | |
|  |  | 15' | 10 | | | | | | | | | | | | |
|  |  | 16' | | 10 | | | | | | | | | | | |
|  |  | 17' | | | 10 | | | | | | | | | | |
|  |  | 18' | | | | | | | | | | | | 10 | |
|  |  | 19' | | | | | | | | | | | | | 10 |
| Monomer | DPGDA | | 40 | 40 | 40 | 45 | 25 | 40 | 40 | | 20 | | 20 | 40.6 | 40 | 40 |
|  | VEEA | | 20 | 20 | 20 | 20 | 20 | 10 | 24.5 | 35 | 50 | 20 | 50 | 20 | 20 | 20 |
|  | DVE-3 | | | | | | 5 | | | | | | | | | |
|  | LA | | 6.4 | 6.4 | 6.4 | 6.4 | 6.4 | 6.4 | 6.4 | 17.4 | | 10 | | 6.4 | 6.4 | 6.4 |
|  | PEA | | 5 | 5 | 5 | 5 | 5 | 5 | 5 | 10 | | 16.4 | | 5 | 5 | 5 |
|  | VCAP | | 5 | 5 | 5 | 5 | 5 | 10 | 0.5 | 14 | 2.4 | 30 | 2.4 | 5 | 5 | 5 |
| Initiator | Lucirin TPO | | 3 | 3 | 3 | 3 | 3 | 3 | 3 | 3 | 10 | 3 | | 3 | 3 | 3 |
|  | Irg819 | | 3 | 3 | 3 | 3 | 3 | 3 | 3 | 3 | | 3 | | 3 | 3 | 3 |
|  | Irg907 | | | | | | | | | | | | 10 | | | |
|  | KAYACURE BMS | | 3 | 3 | 3 | 3 | 3 | 3 | 3 | 3 | 3 | 3 | 3 | 3 | 3 | 3 |
|  | EPA | | 3 | 3 | 3 | 3 | 3 | 3 | 3 | 3 | | 3 | | 3 | 3 | 3 |
|  | EAB | | | | | | | | | | | | 3 | | | |
| Inhibitor | BHT | | 0.5 | 0.5 | 0.5 | 0.5 | 0.5 | 0.5 | 0.5 | 0.5 | 0.5 | 0.5 | 0.5 | | 0.5 | 0.5 |
|  | Phenothiazine | | 0.1 | 0.1 | 0.1 | 0.1 | 0.1 | 0.1 | 0.1 | 0.1 | 0.1 | 0.1 | 0.1 | | 0.1 | 0.1 |
| Additive | UV3510 | | 0.5 | 0.5 | 0.5 | 0.5 | 0.5 | 0.5 | 0.5 | 0.5 | 0.5 | 0.5 | 0.5 | 0.5 | 0.5 | 0.5 |
|  | Tego 450 | | 0.5 | 0.5 | 0.5 | 0.5 | 0.5 | 0.5 | 0.5 | 0.5 | 0.5 | 0.5 | 0.5 | | 0.5 | 0.5 |
|  | BYK348 | | | | | | | | | | | | | 0.5 | | |
| Total | | | 100 | 100 | 100 | 100 | 100 | 100 | 100 | 100 | 100 | 100 | 100 | 100 | 100 | 100 |
| Evaluation | Viscosity | | ○ | ○ | ○ | ◎ | ◎ | ◎ | ◎ | ◎ | ◎ | ◎ | ◎ | ◎ | X | X |
|  | Ink Stability | | ◎ | ◎ | ◎ | ◎ | ◎ | ◎ | ◎ | ◎ | ◎ | ○ | ◎ | ○ | X | X |
|  | Dischargeability (5 kHz) | | ◎ | ◎ | ◎ | ○ | ○ | ◎ | ◎ | ◎ | ◎ | ◎ | ◎ | ◎ | ○ | ○ |
|  | Dischargeability (20 kHz) | | ◎ | ◎ | ◎ | ◎ | ◎ | ◎ | ◎ | ◎ | ◎ | ◎ | ◎ | ◎ | X | X |
|  | Continuous Dischargeability | | ○ | ○ | ○ | ◎ | ◎ | ◎ | ◎ | ◎ | ◎ | ○ | ◎ | ○ | X | X |
|  | Curing Property | | ◎ | ◎ | ◎ | ◎ | ◎ | ◎ | ◎ | ◎ | ◎ | ○ | ◎ | ◎ | X | X |

What is claimed is:

1. An active energy ray-curable inkjet ink, which comprises an isoindoline-based pigment having a specific electric conductance measured by DIN ISO 787/14 of 150 µS/cm or less, wherein the isoindoline-based pigment is C. I. Pigment Yellow 185, and a monomer having EO or PO as a skeleton in an amount of 60 to 90% by weight in the ink, wherein the monomer having EO or PO as a skeleton is selected from the group consisting of 2-(2-vinyloxyethoxy)ethyl acrylate and dipropylene glycol diacrylate, and wherein the isoindoline-based pigment comprises a pigment precursor and a by-product in an amount of 5% by weight or less.

2. The active energy ray-curable inkjet ink according to claim 1, which further comprises a resin-type pigment dispersing agent in an amount of 30 to 100% by weight based on the isoindoline-based pigment.

3. The active energy ray-curable inkjet ink according to claim 1, which further comprises an acyl phosphine oxide as an initiator.

4. The active energy ray-curable inkjet ink according to claim 1, which further comprises an inhibitor in an amount of 0.1% by weight or more in the ink.

5. A method for production of the active energy ray-curable inkjet ink according to claim 1, wherein the method comprises washing the isoindoline-based pigment with a solvent after synthesized.

* * * * *